(No Model.)
W. W. DONALDSON & R. MACRAE.
STORAGE BATTERY PLATE AND PROCESS OF MAKING THE SAME.
No. 471,538. Patented Mar. 29, 1892.
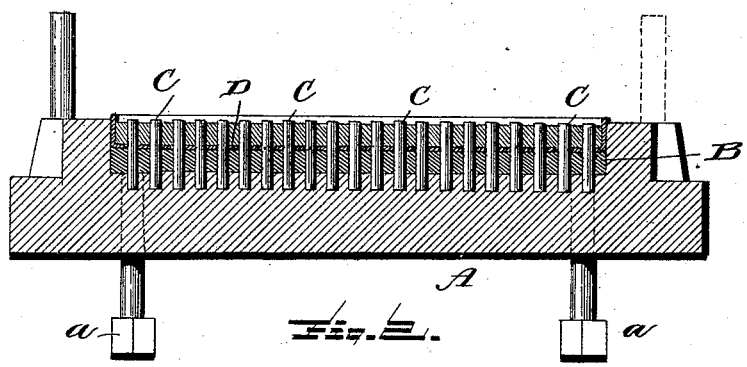
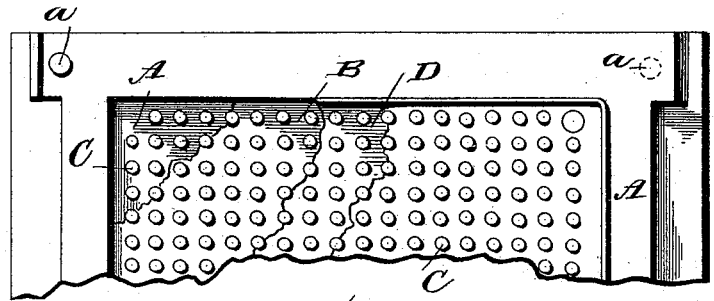
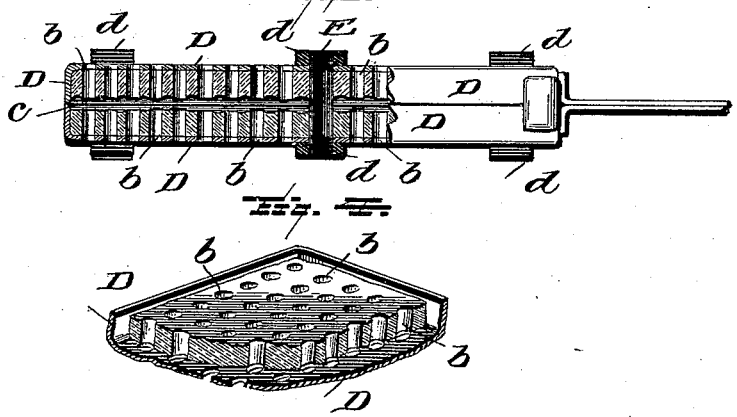
Witnesses
L. C. Hills
E. W. Bond.
Inventors,
Wm. W. Donaldson
Roderick Macrae,
by E. B. Stocking Attorney

UNITED STATES PATENT OFFICE.

WILLIAM W. DONALDSON AND RODERICK MACRAE, OF BALTIMORE, MARYLAND.

STORAGE-BATTERY PLATE AND PROCESS OF MAKING THE SAME.

SPECIFICATION forming part of Letters Patent No. 471,538, dated March 29, 1892.

Application filed August 13, 1891. Serial No. 402,500. (No model.)

*To all whom it may concern:*

Be it known that we, WILLIAM W. DONALDSON and RODERICK MACRAE, citizens of the United States, residing at Baltimore, in the State of Maryland, have invented certain new and useful Improvements in Storage-Battery Plates and Process of Making the Same, of which the following is a specification, reference being had therein to the accompanying drawings.

This invention relates to certain new and useful improvements in storage-battery plates and also to the process of making the same.

It has for its objects, among others, to provide an improved plate at less cost and possessing greater surface of active material and having provision for the expansion of the active material, thereby increasing the life of the plate. We form the support in the form of a tray, which is placed in a form provided with pins, and pressure is then applied to force the pins through the support, after which the active material is placed in the tray, the pins forming perforations in the active material. Two trays thus formed are placed together, with the inactive support to the outside, and fastened at the edges in any suitable manner. In placing the two halves of the plate together a small space is left between the surfaces of the active material to allow room for the expansion, which takes place in the active material of the positive plate after it has been in use for some time, and also to allow a free circulation of the liquid in the inside of the completed plate. We thus not only provide a plate having a very great surface of active material in contact with the liquid, but obviate the buckling of the plate due to the expansion of the active material.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a vertical cross-section through the form with a half-plate therein and the active material in the plate. Fig. 2 is a top plan of the same with portions broken away. Fig. 3 is an edge view of a completed plate with portions broken away and parts in section. Fig. 4 is a perspective view of a portion of one of the half-plates with the active material therein.

Like letters of reference indicate like parts throughout the several views.

In carrying out our invention we take a suitable form or mold A, having a cavity or chamber of the desired dimensions, and in this cavity we arrange a movable plate B, which may be actuated in any suitable manner when desired to force out the completed half-plate. We have shown screws $a$, of which there may be any desired number and designed to be operated in any suitable way.

The form or mold is provided with a plurality of pins C, which are held therein in any suitable manner and are of such length as to extend substantially to the top of the mold, as seen in Fig. 1. The number of these pins and the manner of arrangement may be varied at pleasure without departing from the spirit of the invention or sacrificing any of its advantages. The movable plate B is provided with openings coincident with and adapted to receive the pins of the form or mold, as seen in Fig. 1.

We take a plate D of any suitable inactive material—such, for instance, as lead—for the support and place it flat over the top of the cavity in the mold or form and over the pins and then apply pressure thereon, the movable plate B being down, as shown in Fig. 1, and force the said plate D into the form shown in Fig. 1—that is, into a sort of tray—with its edges turned up the depth of the cavity in the mold above the movable plate. The pins are forced through the plate until their tops or upper ends are substantially on a level with the top of the tray, as seen in Fig. 1. The tray thus formed is then filled with the active material, which may be of any desired nature, and allowed to stand a sufficient length of time to set, being packed around the pins, and then it is removed by forcing outward the plate B, and when thus removed it will be provided with a plurality of holes $b$, formed by the pins, which will of course be coincident with the holes in the surrounding or inclosing plate, as seen in Figs. 3 and 4. Another plate is then formed in the same manner and two plates or trays, or rather half-plates, are placed together, as seen in Fig. 3, and united in any suitable manner, as by burning the lead at different points or by applying a strip over the joint between the adjacent edges of the plates.

The half-plates are formed with their lips extended slightly above the active material, as seen in Figs. 1, 3, and 4, so that when the two are placed together there will be a small space $c$ left or formed between the adjacent surfaces of the active material, as seen in Fig. 3, to allow room for the expansion of the active material of the positive plate after it has been in use for some time, and also to allow a freer circulation of liquid in the inside of the plate, and thus buckling of the plate by expansion is prevented and the life of the plate greatly increased.

In order to further guard against spreading of the two half-plates and to afford a means of insulation when two or more of the completed plates are put together, we sometimes provide the same, preferably centrally, with a rubber or bolt or rivet E, provided upon each end with a nut $d$, as seen in Fig. 3, although this may sometimes be omitted.

Modifications in detail may be resorted to without departing from the spirit of the invention or sacrificing any of its advantages.

What we claim as new is—

1. A storage-battery plate having perforations through both the active and inactive material and a space between the adjacent inner surfaces of the active material, as set forth.

2. A storage-battery plate formed of two like parts, each containing active material with perforations therethrough, and the two parts secured together with a space between the active material of said parts, as and for the purpose specified.

3. A storage-battery plate having perforations through both the active and inactive material, with an interior space separating the active material and a spacing device, as set forth.

4. A storage-battery plate having transverse perforations through its active and inactive material and a space extending substantially the length and breadth of the plate interiorly thereof, as set forth.

5. The process of forming storage-battery plates, which consists in shaping the outer covering, perforating the same, applying the active material around the pins or cores, registering with the perforations of the covering, and finally joining two such plates, as set forth.

6. The process of forming storage-battery plates, which consists in shaping the outer covering, perforating the same, applying the active material around pins or cores registering with the perforations of the covering, joining two such plates, and providing space between the active materials for expansion and for circulation of liquid, as set forth.

In testimony whereof we affix our signatures in presence of two witnesses.

WILLIAM W. DONALDSON.
RODERICK MACRAE.

Witnesses:
HEATH SUTHERLAND,
L. C. HILLS.